United States Patent [19]
Holmquist et al.

[11] Patent Number: 5,636,282
[45] Date of Patent: Jun. 3, 1997

[54] METHOD FOR DIAL-IN ACCESS SECURITY USING A MULTIMEDIA MODEM

[75] Inventors: Kurt E. Holmquist, Largo; Richard K. Smith, Seminole, both of Fla.

[73] Assignee: Paradyne Corporation, Largo, Fla.

[21] Appl. No.: 262,169

[22] Filed: Jun. 20, 1994

[51] Int. Cl.⁶ .............................. H04L 9/32; H04M 11/06
[52] U.S. Cl. .............................. 380/25; 380/23; 379/95; 379/442
[58] Field of Search ................. 379/95, 442; 380/25, 380/23; 381/42

[56] References Cited

U.S. PATENT DOCUMENTS

| | | | |
|---|---|---|---|
| 3,896,266 | 7/1975 | Waterbury | 381/42 X |
| 3,984,637 | 10/1976 | Caudill et al. | 379/93 |
| 4,430,728 | 2/1984 | Beitel et al. | 379/95 X |
| 4,520,233 | 5/1985 | Smith | 179/1.5 R |
| 4,604,499 | 8/1986 | Hughes | 379/95 |
| 4,679,226 | 7/1987 | Muehleisen | 379/95 |
| 4,763,351 | 8/1988 | Lipscher et al. | 379/95 |
| 4,876,717 | 10/1989 | Barron et al. | 380/25 |
| 4,907,267 | 3/1990 | Gutzmer | 379/442 |
| 4,993,068 | 2/1991 | Piosenka et al. | 380/23 |
| 4,998,279 | 3/1991 | Weiss | 380/23 |
| 5,003,595 | 3/1991 | Collins et al. | 380/25 |
| 5,220,595 | 6/1993 | Uehara | 379/74 |
| 5,247,497 | 9/1993 | Cohn | 379/95 X |
| 5,274,695 | 12/1993 | Green | 379/88 |
| 5,301,246 | 4/1994 | Archibald et al. | 380/23 |
| 5,335,276 | 8/1994 | Thompson et al. | 380/25 X |
| 5,365,574 | 11/1994 | Hunt et al. | 379/88 |

FOREIGN PATENT DOCUMENTS

| | | | |
|---|---|---|---|
| 0262859 | 4/1988 | European Pat. Off. | H04M 11/06 |
| 0588519 | 3/1994 | European Pat. Off. | G06F 1/00 |
| 95303904 | 9/1995 | European Pat. Off. | |
| 3608349 | 1/1987 | Germany | G06F 12/14 |
| 08404216 | 10/1984 | WIPO | H04J 1/02 |

*Primary Examiner*—Gilberto Barron, Jr.
*Attorney, Agent, or Firm*—Thomas, Kayden, Horstemeyer & Risley; Sanford J. Asman; David P. Kelley

[57] ABSTRACT

A multi-media modem is used to provide a security access arrangement that identifies a calling party to a computer system. In particular, a multi-media modem couples both an analog channel and a data channel to the computer system. The analog channel conveys the calling party's identification information, while the data channel conveys a data signal from the calling party. The computer system verifies the calling party's identification information communicated over the analog channel and, if the verification is successful, immediately establishes, or continues, data communications with the calling party over the data channel.

16 Claims, 5 Drawing Sheets

FIG. 3

CALLING SIGNAL

| SIGNAL NAME | TONE 1 | TONE 2 | SYMBOL RATE INDICATED |
|---|---|---|---|
| SVD CNG-a | 1550Hz @ -3dB | 825Hz @ -3dB | 3000 s/s |
| SVD CNG-b | 1550Hz @ -3dB | 875Hz @ -3dB | 2800 s/s |

ANSWER IDENTIFICATION SIGNAL*

| SIGNAL NAME | TONE 1 | TONE 2 | SYMBOL RATE INDICATED |
|---|---|---|---|
| SVD AID-a | 1000Hz @ -3dB | 801Hz @ -3dB | 3000 s/s |
| SVD AID-b | 1000Hz @ -3dB | 850Hz @ -3dB | 2800 s/s |

*FOLLOWED BY STANDARD 2100Hz ANSWER TONE

FIG. 4

| SYMBOL BLOCK 405 | | SYMBOL BLOCK 410 | |
|---|---|---|---|
| DATA SEGMENT 406 | CONTROL SEGMENT 407 | DATA SEGMENT 411 | CONTROL SEGMENT 412 |
| S1, S2, S3,...S55, S56 | S57, S58,...S69, S70 | S1, S2, S3,...S55, S56 | S57, S58,...S69, S70 |

TIME →

METHOD FOR DIAL-IN ACCESS SECURITY USING A MULTIMEDIA MODEM

BACKGROUND OF THE INVENTION

The present invention relates to data communications equipment and to computer systems. In particular, this invention relates to the use of data communications equipment to provide secure access to a computer system.

The use of computers in today's world is continually on the increase, from main-frames to personal computers more and more people are using computer systems. In fact, it is the accessibility of a computer itself, via a modem and the public switched telephone network (PSTN), that allows almost anyone to benefit from the use of a computer. Unfortunately, this "dial-up" accessibility also seems to attract "intruders," i.e., illegitimate users of a computer system. As a result, the security of a computer system, or even a network of computers, as to both the integrity and distribution of the information stored on a computer is an item of continuing concern to the legitimate owners and operators of computers. In response to this need of prodding some type of access security to a computer system a number of alternatives have been proposed.

Some approaches utilize the well-known "automatic number identification" (ANI) feature available from most public switched telephone network providers. For example, U.S. Pat. No. 5,003,595, issued to Collins et al. on Mar. 26, 1991, describes a system where a private branch exchange (PBX), upon answering an incoming data call, provides the calling party's ANI to an adjunct processor, i.e., computer, for analysis. This adjunct processor compares the calling party's ANI to a list of authorized ANI numbers. If the calling party's ANI is on this authorization list then the data call is completed. However, if the calling party's ANI is not on the list of numbers, the adjunct processor instructs the PBX not to answer the data call. In contrast to the Collins et al. patent, U.S. Pat. No. 5,301,246, issued Apr. 5, 1994 to Archibald et al. describes a modem that includes a list of authorized ANI numbers. For any incoming data call the modem compares the calling party's ANI to each of the authorized ANI numbers. The modem answers the incoming data call only if a match is found.

Another approach utilized by the prior an is the use of an individual's "biometric" information. In particular, an individual's voice print can be used to verify a person's identify. U.S. Pat. No. 4,876,717, issued to Barron et al. on Oct. 24, 1989, describes a system that includes a PBX in association with an adjunct processor. In this system, when a calling party wants to access a computer system, the calling party first establishes a "voice-call" to the system. Upon answering the voice-call, the PBX transfers the call to the adjunct processor. The latter prompts the calling party, via a voice recording, to speak a predefined identifying phrase. As the calling party speaks this phrase the adjunct processor generates a voiceprint of the calling party. After generating the calling party's voiceprint, the calling party is instructed to "hang-up." The adjunct processor than compares the calling party's voiceprint to a set of voiceprints that represent authorized users. If there is a match between the calling party's voiceprint and a voiceprint of an authorized user, the adjunct processor calls back the calling party to establish a data call between a host computer coupled to the PBX and the calling party. In making this second telephone call, the adjunct processor uses a telephone number that is a priori associated with the, now identified, calling party.

The above-mentioned prior art, while providing secure arrangements to access computers, arc not the complete answers to the problem. For example, the Collins et al. and Archibald et al. approaches utilize the calling party's ANI, but this does not guarantee the calling party is the actual person authorized to use the computer system. It only guarantees, to a degree, the location of the calling party in the public switched telephone network. On the other hand, the Barron et al. patent, albeit providing a better identification of the actual calling party, requires two telephone calls, one to identify the calling party and one to establish the data call upon verification of the calling party. In addition, since this system initiates the data call using a predefined telephone number, the original calling party must be at the location associated with this predefined telephone number absent the use of any sophisticated call forwarding arrangements. As a result, the two-call approach is usually impractical for a person who is on a business trip.

SUMMARY OF THE INVENTION

We have realized a simple, and effective, technique for providing a security arrangement that identifies a calling party to a computer system. In particular, a multi-media modem couples both an analog channel and a data channel to the computer system. The analog channel conveys the calling party's identification information, while the data channel conveys a data signal from the calling party. The computer system verifies the calling party's identification information communicated over the analog channel and, if the verification is successful, immediately establishes, or continues, data communications with the calling party over the data channel.

In an embodiment of the invention, a simultaneous voice and data modem (SVD) is used to provide both an analog channel and data channel between a calling party and a computer. The latter is coupled to both the analog port and data port of the SVD modem. When the SVD modem answers an incoming telephone call the SVD modem provides the calling party's voice signal to the host computer via the analog port and a data signal to the host computer via the data port. The computer then transmits a voice recording to the calling party via the analog port This voice recording instructs the calling party to speak a predefined phrase and to enter a "login" via their data terminal. As the calling party speaks the phrase the computer generates a voiceprint of the calling party. In addition, after receiving the requested "login," the computer retrieves from a nonvolatile memory device a voiceprint a priori associated with the received "login." If there is a match between the calling party's voiceprint and the retrieved voiceprint, the computer allows the data connection to immediately be established or to continue. However, if the calling party's voiceprint does not match, the computer hangs-up. Advantageously, this technique uses only one telephone call and allows the calling party to be located anywhere in the PSTN network since no call-back is performed by the computer system.

BRIEF DESCRIPTION OF THE DRAWING

FIG. 3 is a table showing illustrative SVD identification signal assignments;

FIG. 4 is an illustrative SVD symbol block that provides a secondary communications channel;

DETAILED DESCRIPTION

Figure 1:
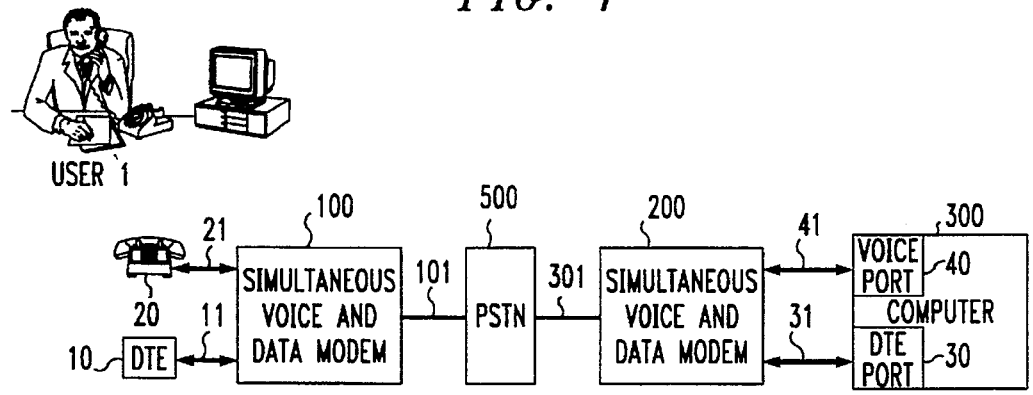
FIG. 1 shows a block diagram of a simultaneous voice and data communications system embodying the principles of the invention.

A block diagram of a simultaneous voice and data communications system embodying the principles of the invention is shown in FIG. 1. As shown in FIG. 1, there are illustratively two communications endpoints represented by user 1 and computer 300. Other than the inventive concept, which is described below, computer 300 is any commercially available computer system that includes at least one data terminal equipment (DTE) port, DTE 30, and at least one analog port, herein represented by voice port 40. It is assumed the computer 300 includes components (not shown) that allow computer 300 to both generate prerecorded messages via voice port 40 and generate voiceprints from incoming voice signals received at voice port 40 as known in the art. Both voice port 40 and DTE port 30 of Computer 300 are coupled to PSTN 500 via SVD modem 200. The equipment of user 1 includes DTE 10, telephone 20, and SVD modem 100. DTE 10 is coupled to SVD modem 100 via line 11. Telephone 20 is coupled to SVD modem 100 via line 21. It is assumed that line 21 represents a "tip/ring" type of electrical interface. SVD modem 100 is coupled to public switched telephone network (PSTN) 500, via local loop 101, for originating and answering telephone calls. Local loop 101 is a typical "tip/ring" facility, i.e., a wire-pair, upon which a voice-band signal is transmitted between SVD modem 100 and PSTN 500. Finally, the signal connections between the data communications equipment, represented by SVD modems 100 and 200, and respective data terminal equipment, represented by DTEs 10 and 30, are assumed to conform to the Electronic Industry Association (EIA) RS-232 interface.

Before describing the inventive concept below, a description of the general operation of an SVD modem is provided using SVD modem 100 as an example. The basic operation of an SVD modem is also described in the commonly assigned, U.S. Pat. No. 5,448,555 of Bremer et al. entitled "Simultaneous Analog and Digital Communication," issued on Sep. 5, 1995.

Figure 2:
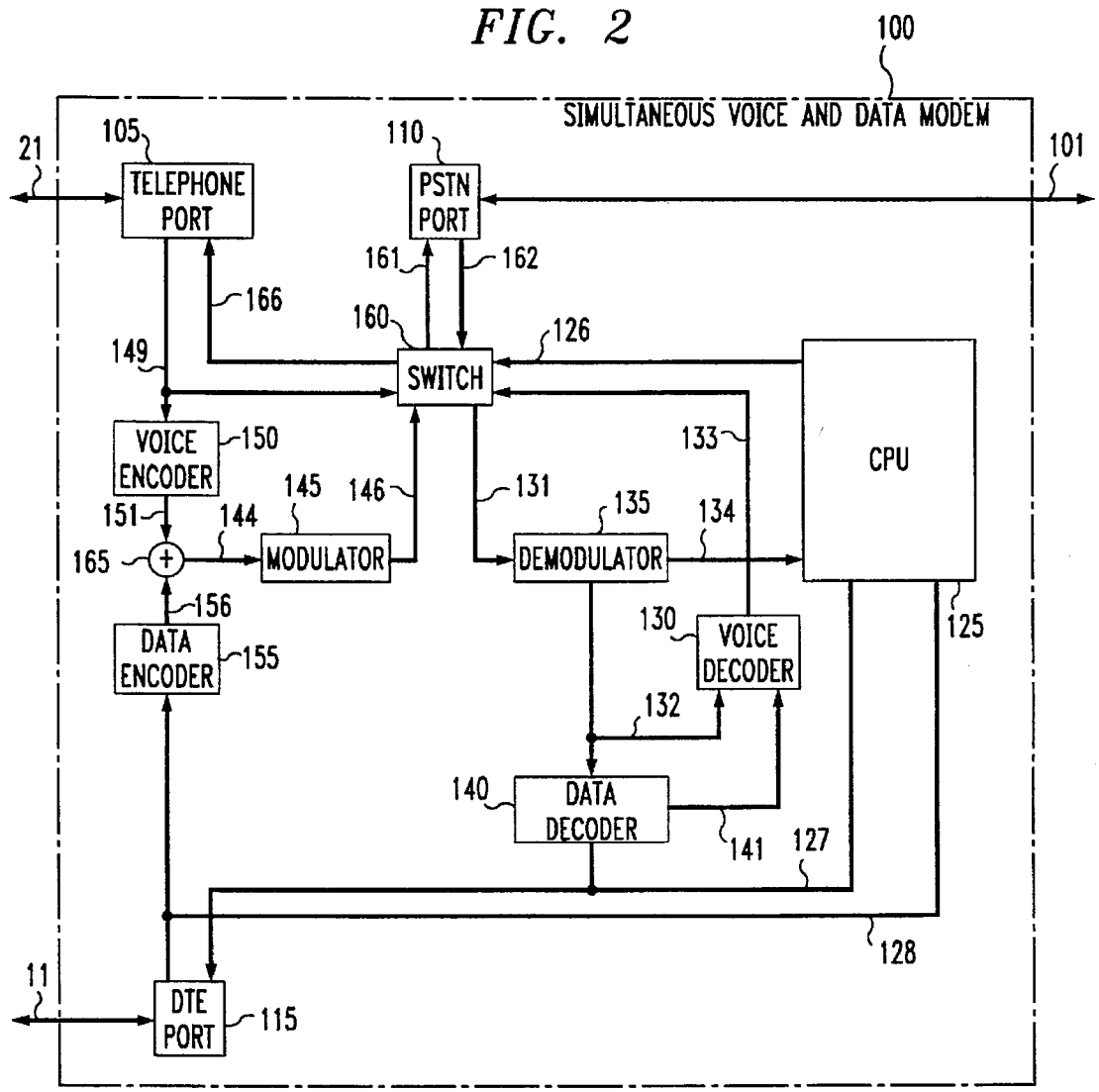
FIG. 2 shows a block diagram of a simultaneous voice and data modem.

FIG. 2 shows an illustrative block diagram of SVD modem 100. SVD modem 100 operates in either a "voice-only" mode, a "data-only" mode, or an SVD mode. In the "voice-only" mode, SVD modem 100 simply communicates a signal, e.g., a voice signal, present on telephone port 105 to PSTN port 110. In the "data-only" mode, SVD modem 100 modulates a data signal received via DTE port 115 for transmission via PSTN port 110 to a remote data endpoint, and demodulates a modulated data signal received via PSTN port 110 for transmission to DTE 10. Finally, in the SVD mode, SVD modem 100 provides the combination of the "voice-only" and "data-only" mode with the exception that the signal received and transmitted via PSTN port 110 is a combined voice and data signal (hereafter referred to as an "SVD signal"). Other than the inventive concept, the individual components of SVD modem 100 are well-known and are not described in detail. For example, CPU 125 is a microprocessor-based central processing unit, memory, and associated circuitry for controlling SVD modem 100.

CPU 125, of SVD modem 100, controls switch 160, via line 126, as a function of the above-mentioned operating mode of SVD modem 100. In the "voice-only" mode, switch 160 couples any signal on line 162 to line 166 for transmission via telephone port 105, and couples any signal on line 149 to line 161 for transmission via PSTN port 110. The remaining components, e.g., data encoder 155, data decoder 140, voice decoder 130, and voice encoder 150, are disabled by control signals (not shown) from CPU 125. Consequently, in the "voice-only" mode any analog signal appearing at one of the analog ports is coupled, or bridged, to the other analog port.

If SVD modem 100 is in the "data-only" mode, switch 160 couples any signal on line 146 to line 161 for transmission via PSTN port 110, and couples any signal on line 162 to line 131. In the "data-only" mode, voice encoder 150 and voice decoder 130 are disabled by control signals (not shown) from CPU 125. In this mode of operation, any data signal appearing at DTE port 115 (assuming SVD modem 100 is not receiving "AT commands") is encoded by data encoder 155. DTE port 115 is assumed to represent the above-mentioned EIA RS-232 interface. The latter couples not only data from DTE 10 for transmission to an opposite endpoint, but also couples commands from DTE 10 to SVD modem 100 during the well-known "AT command mode" of operation. Data encoder 155 includes any of the well-known encoding techniques like scrambling, trellis-coding, etc., to provide a sequence of symbols on line 156 at a symbol rate, 1/T to modulator 145. The symbols are selected from a two-dimensional signal space (not shown). Note, since voice encoder 150 is disabled, adder 165 does not add a signal to the output signal from data encoder 155. Modulator 145 illustratively provides a quadrature amplitude modulated signal (QAM) to PSTN port 110 via switch 160. Similarly in the reverse direction, a QAM signal received at PSTN port 110 is provided to demodulator 135 via switch 160. Demodulator 135 provides an encoded data stream to data decoder 140. The latter performs the inverse function of data encoder 155 and provides a received data signal to DTE port 115 for transmission to DTE 10.

Finally, if SVD modem 100 is in the SVD mode, switch 160 couples any signal on line 146 to line 161 for transmission via PSTN port 110, and couples any signal on line 162 to line 131. In the SVD mode, voice encoder 150 and voice decoder 130 are enabled by control signals (not shown) from CPU 125. In this mode, any analog signal, e.g., a voice signal, appearing on line 149 is applied to voice encoder 150. The latter processes the voice signal so that it is mapped into the two-dimensional signal space used by data encoder 155 to provide a voice signal point. This voice signal point defines the magnitude and angle of a "voice signal vector" about the origin of the two-dimensional signal space. Voice encoder 150 provides a sequence of two-dimensional signal points, at the predefined symbol rate of 1/T symbols per sec., on line 151. Adder 165 adds each voice signal vector on line 151, if any, to a respective one of the symbols provided by data encoder 155 to provide a stream of signal points to modulator 145. As described above, modulator 145 provides a QAM modulated signal to PSTN port 110 via switch 160. This QAM modulated signal is the above-mentioned SVD signal since it represents both voice and data.

In the reverse direction, the received SVD signal on line 131 is processed as described above by demodulator 135 and data decoder 140 to provide the received data signal on line 127. In addition, voice decoder 130 receives both the received signal point sequence from demodulator 135 and the decoded symbol sequence from data decoder 140. Voice decoder 130 includes suitable buffering to allow for the decoding time needed by data decoder 140 to make a decision as to a received symbol. Voice decoder 130 subtracts the received symbol provided by data decoder 140 from the respective received signal point provided by demodulator 135 to yield the voice signal vector and then performs the inverse function of voice encoder 150 to provide a received voice signal to telephone port 105, via line 133.

As a result, this SVD technique advantageously provides a voice-band signal that has both an audio portion and a data portion, hereafter referred to as the analog channel and the data channel, respectively. This allows two users, or endpoints, with simultaneous voice and data capable modems to communicate data between them and talk at the same time—yet only requires one "tip/ring" type telephone line at each user's location.

During the establishment of an SVD connection it is advantageous for the calling SVD modem to initially signal the far-end, or called, SVD modem, that the calling modem is also an SVD modem. This initial signaling is accomplished by the use of an SVD identification signal that is transmitted by the calling SVD modem after dialing the telephone number of the called SVD modem. This type of notification allows the answering SVD modem to immediately switch to an SVD mode as opposed to initially defaulting to a standard data modulation like CCITT V.32 and then switching to an SVD mode. An illustrative set of distinctive identification signals for use by an SVD modem is shown in FIG. 3. These hand-shaking signals include a calling signal, SVD CNG, which include calling tones "a" and "b," and an answer identification signal, SVD AID, which includes answering tones "a" and "b." The called SVD modem provides the answer identification signal as an acknowledgment to the calling SVD modem that the call has been answered by an SVD compatible modem.

The determination of what mode SVD modem 100 is in depends upon whether SVD modem 1130 is originating or answering a telephone call. If SVD modem 100 is originating a telephone call, then the calling party, e.g., user 1, can select the particular mode of operation in a number of ways. One illustrative way is simply via a predefined command mode instruction provided via DTE port 115. Another way is for SVD modem 100 to evaluate the state of various signals at both telephone port 105 and DTE port 115. For example, "voice-only" mode is entered if an "off-hook" signal is detected at telephone port 105 and there is no "data-terminal-ready" (DTR) signal from DTE 10 at DTE port 115. This DTR signal is a part of the above-mentioned EIA RS-232 interface specification. Conversely, "data-only" mode is entered if there is no "off-hook" signal but the DTR signal is active. Finally, the SVD modem is entered if an "off-hook" signal is detected and the DTR signal is active.

When user 1 is the called party, i.e., when SVD modem 100 answers an incoming telephone call, the determination of what operating mode to enter is performed as follows. SVD modem 100 first determines if an SVD identification signal is being transmitted by the calling party's equipment. If SVD modem 100 detects an SVD identification signal, then the SVD mode of operation is entered. However, if no SVD identification signal is detected, SVD modem 100 can either enter the "voice-only" mode or the "data-only" mode. The particular selection is set by user 1 via a predefined command mode instruction provided via DTE port 115. This command mode instruction sets a "default" mode of operation for SVD modem 100 if no SVD identification signal is detected from the calling party's equipment.

Once an opposite SVD modem has been identified and both modems are communicating in the SVD mode, it is necessary for each SVD modem to communicate control and status information to the opposite endpoint. This is done via a secondary channel that communicates signaling information between, e.g., SVD modem 100 and SVD modem 200, and can be implemented in any number of ways. For example, as is known in the art, a secondary channel can be provided by multiplexing the data modulated signal (here the SVD signal) with another control signal; or a secondary channel can be provided as described in the co-pending, commonly assigned, U.S. Patent application of Bremer et al. entitled "Side-Channel Communications in Simultaneous Voice and Data Transmission," issued on Apr. 9, 1996. FIG. 4 shows a diagram of a transmission scheme that includes a side-channel within an SVD signal. This SVD side-channel not only provides for the transport of additional information between any SVD endpoints—but also allows the voice signal to be transmitted across the full bandwidth of the SVD data connection. As can be observed from FIG. 4, information from an SVD modem is provided in a frame, or "symbol block," e.g., symbol block 405. For the purposes of this example, a symbol block comprises 70 symbols. Consecutive symbols within each symbol block are identified as S1, S2, S3, . . . , S70. Each symbol block is further divided into a data segment, e.g., data segment 406; and a control segment, e.g., control segment 407. Let the group of symbols in the data segment be S1 to S56. These are the "data symbols" and always convey DTE data. For the purposes of the following discussion the symbol rate is illustratively 3000 symbols/second (s/sec.), although other symbol rates may be used, e.g., 2800 s/sec. At a symbol rate of 3000 s/sec., the average data symbol rate of a symbol block is equal to (56/70)×3000=2400 s/sec. Consequently, if there are 6 bits of data per data symbol, the resultant data rate is 14400 bits/sec (bps). It is assumed that this data rate is high enough to meet a user's needs so that the remaining bandwidth of the SVD data connection can be allocated to the control segment, which provides the side-channel.

The remaining symbols of the control segment, i.e., S57 to S70, are the "control symbols." Usually, the latter never convey DTE data, but convey control information. Each control symbol represents a number of "control bits." For example, some of these control bits represent a state identifier, which provides information to the far-end, or receiving, SVD modem as to the mode of operation of the transmitting SVD modem, i.e., whether the transmitting SVD modem is in the "voice-only" mode, "data-only" mode, or SVD mode, of operation. The control symbols are encoded and scrambled the same as the DTE data symbols, e.g., they use the same signal space. The control symbols provide the side-channel for conveying additional signaling information between SVD modem endpoints. Although the data symbols represent user data and the control symbols represent control information, both the data and control symbols may also convey analog data, which in this example is any voice signal that is provided to SVD modem 100 by telephone 20. As a result, the side-channel is a part of the simultaneous voice and data transmission.

Figure 5:
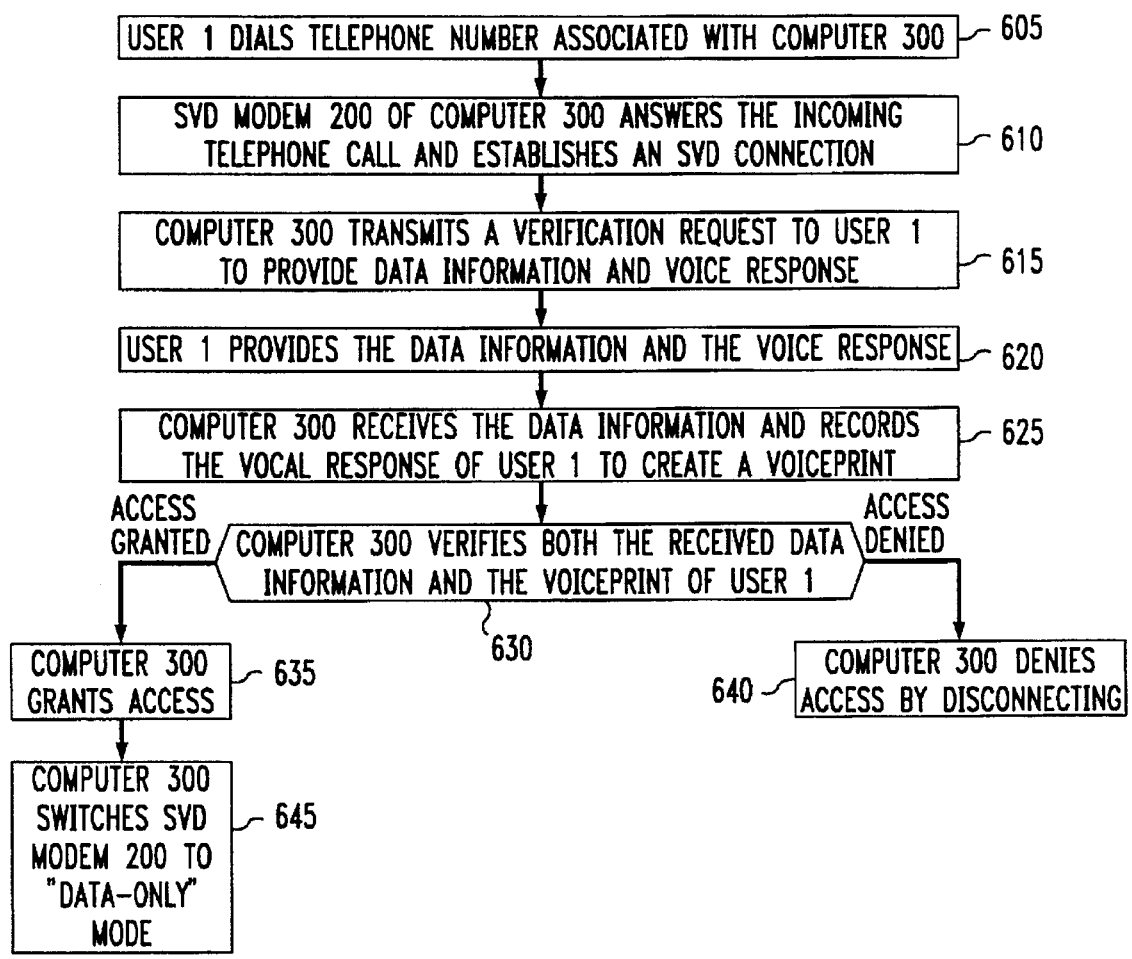
FIG. 5 is an illustrative flow diagram of a method embodying the principles of the invention for providing a security arrangement.

Having described the general operation of an SVD modem, the inventive concept will now be described. Referring back to FIG. 1, it is assumed both SVD modems 100 and 200 have been preconfigured to default to the above-mentioned SVD mode of operation. At this point, in order to facilitate understanding of the inventive concept, reference can also be made to FIG. 5, which represents an illustrative method embodying the principles of the invention. In step 605, user 1 dials a telephone number associated with computer 300. SVD modem 100 goes "off-hook" and transmits this telephone number to PSTN 500 by providing a respective sequence of dual-tone multifrequency (DTMF) digits. PSTN 500 routes this telephone call as is known in the art. A local exchange carrier (not shown) within PSTN 500 "rings" SVD modem 200 of computer 300 via line 301. In step 610, SVD modem 200 answers the telephone call by going "off-hook" and, upon detecting an SVD identification signal, performs a handshaking sequence with SVD modem 100 to thereby establish a simultaneous voice and data connection between computer 300 and the terminal equipment of user 1. SVD modem 200 also "rings" voiceport 40 of computer 300 and provides a "data-set-ready" (DSR) indication to DTE port 30. In response, computer 300 goes "off-hook" at voiceport 40 and provides a DTR indication to SVD modem 200. As a result, the analog channel provided by SVD modem pair 100 and 200 communicates respective voice signals between voice port 40 of computer 300 and telephone 20 of user 1, and the data channel between this modem pair communicates respective data signals between DTE port 30 of computer 300 and DTE 10 of user 1. It should be noted that although there is "data communications" between user 1 and computer 300 at this point, the latter has not yet allowed user 1 to access the information stored on computer 300.

Computer 300 transmits a verification request to user 1 to provide additional data information and a voice response in step 615. In particular, computer 300 transmits a data prompt such as a "login" request to user 1 over the data channel, and a prerecorded voice prompt, such as a request to repeat a predefined phrase, over the voice channel. As noted earlier, it is assumed that computer 300 includes standard speech synthesis technology to provide the verbal prompt transmitted by computer 300. The predefined phrase can either be a "stock" phrase, or one of a number of phrases randomly selected by the computer. User 1 transmits the requested information in step 620 by entering, via DTE 10, a preassigned "login," and by verbally repeating the requested phrase into a handset of telephone 20. Computer 300 receives the requested data information via DTE port 30 and records the vocal response of user 1 via voice port 40 to create a voiceprint of user 1 in step 625. Computer 300 verifies both the received data information and the voiceprint of user 1 in step 630. In particular, computer 300 compares the data information entered by user 1 to a list of authorized logins stored in a nonvolatile storage device (not shown) of computer 300. Similarly, computer 300 compares the voiceprint of user 1 to an authorized voiceprint stored in a nonvolatile storage device (not shown) of computer 300. This authorized voiceprint represents an authorized user of computer 300 for that "login." If either, or both, of the received data information and voiceprint do not match a respective authorized login and authorized voiceprint, then computer 300 simply disconnects in step 640. Computer 300 disconnects by "dropping" the DTR signal via DTE port 30 and "hanging-up" at voice port 40. It should be noted that if computer 300, for whatever reason, never creates a voiceprint in step 625, e.g., user 1 does not repeat the requested phrase, then computer 300 "times-out," e.g., after five seconds, and disconnects from SVD modem 200 as described above.

However, if the both the data information entered by user 1 and the voicepit of user 1 match a respective authorized login and voiceprint stored a priori, then computer 300 grants access in step 635 and allows user 1 to continue the data session. In addition, computer 300 transmits a predefined "AT-command" instruction to SVD modem 200 via DTE port 30 in step 645. This predefined "At-command" instructs SVD modem 200 to enter "data-only" mode so that the entire communications channel bandwidth between SVD modems 100 and 200 is allocated to data transmission. SVD modem 200 transmits the new mode information to SVD modem 100 via the above-described SVD side-channel.

From the above description, it can be observed that access to computer 300 was controlled pending verification of the biometric information of user 1, i.e., the voiceprint, at the same time that data connectivity was already established between DTE 10 and DTE port 30. The voice signal from which computer 300 created the voiceprint information was communicated over the analog channel of the SVD connection while the data connection concurrently existed on the data channel. Upon verification of the voiceprint, computer 300 simply continues to allow access to computer 300 via the data channel—user 1 was not required to disconnect, computer 300 did not have to perform a callback, and user 1 was not restricted in accessing computer 300 from a particular location in the PSTN network. In addition, an additional level of security can be provided by using both the analog and data channel to transmit biometric information. For example, the data channel can transmit a person's retinal pattern, while the analog channel provides the person's voice signal. The host computer can then verify the user's identity using both types of biometric information. In this instance, it is assumed that suitable scanning equipment is coupled to DTE 10 of user 1.

Figure 6:
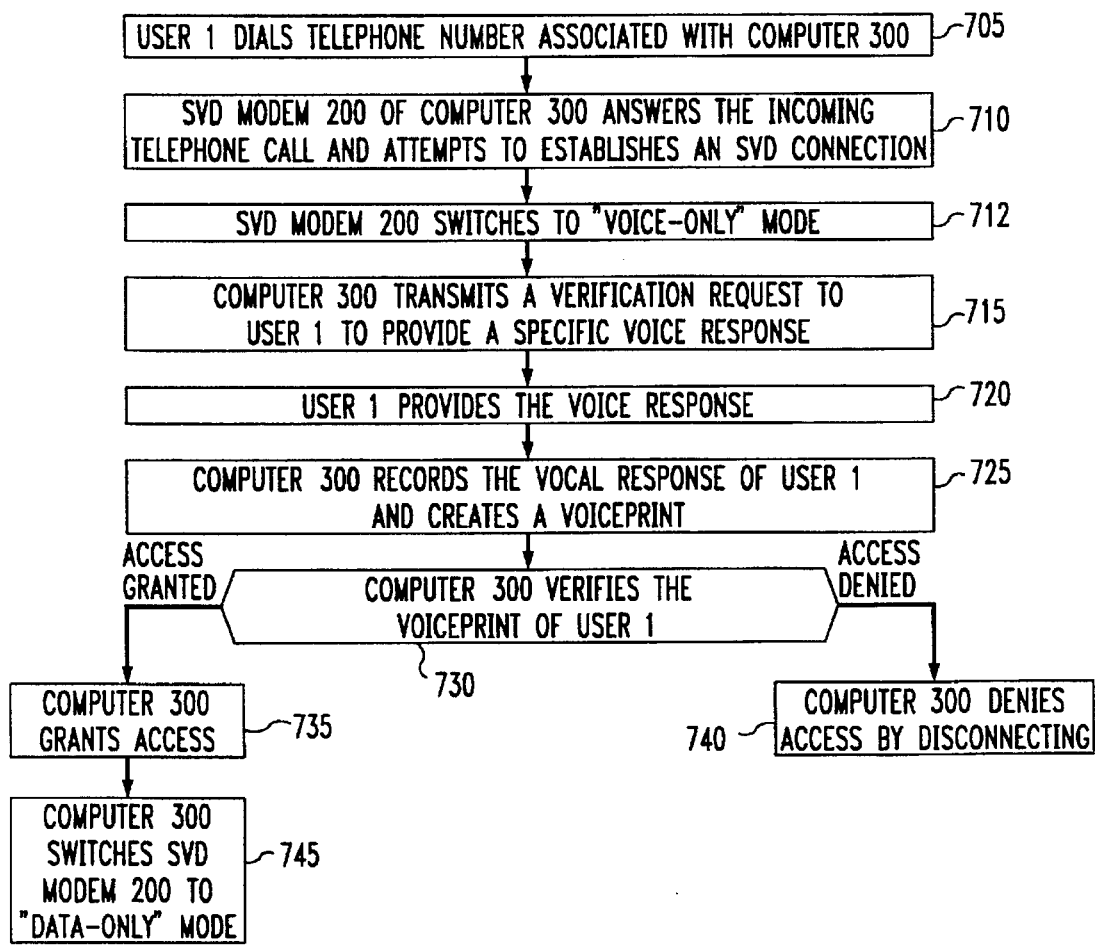
FIG. 6 is an illustrative flow diagram of another method embodying the principles of the invention for providing a security arrangement.

Another illustrative method embodying the principles of the invention is shown in FIG. 6. This method is similar to the method of FIG. 5 except that the initial telephone connection between user 1 and computer 300 is a "voice-only" connection. In this method, it is assumed that user 1 sets SVD modem 100 initially to "voice-only" mode. In step 705, user 1 dials a telephone number associated with computer 300. PSTN 500 routes this telephone call to SVD modem 200 of computer 300 via line 301. In step 710, SVD modem 200 answers the telephone call by going "off-hook" and attempts to perform a handshaking sequence with SVD modem 100 to thereby establish a simultaneous voice and data connection between computer 300 and the terminal equipment of user 1. However, SVD modem 200 does not detect an SVD identification signal and defaults to "voice-only" mode in step 712. As a result, only an analog channel is provided by SVD modem pair 100 and 200 to communicate respective voice-band signals between voice port 40 of computer 300 and telephone 20 of user 1.

Computer 300 transmits a prerecorded voice prompt, such as a request to repeat a predefined phrase, over the voice channel in step 715. It is assumed that computer 300 includes standard speech synthesis technology to provide the verbal prompt transmitted by computer 300. User 1 verbally repeats the requested phrase into a handset of telephone 20 in step 720. Computer 300 receives the vocal response of user 1 via voice port 40 and creates a voiceprint of user 1 in step 725. Computer 300 verifies the voiceprint of user 1 in step 730. In particular, computer 300 compares the voiceprint of user 1 to a number of authorized voiceprints stored in a nonvolatile storage device (not shown) of computer 300. The authorized voiceprints represent authorized users of computer 300. If the voiceprint of user 1 does not match a respective authorized voiceprint, then computer 300 simply disconnects in step 740. Computer 300 disconnects by "hanging-up" at voice port 40. It should be noted that if computer 300, for whatever reason, never creates a voiceprint in step 725, e.g., user 1 does not recite the requested phrase, then computer 300 "times-out," e.g., after five seconds, and disconnects from SVD modem 200 as described above.

However, if the voiceprint of user 1 matches one of the stored authorized voiceprints, then computer 300 grants access in step 735 and allows user 1 to establish a data session. In particular, computer 300 transmits a predefined "AT-command" instruction to SVD modem 200 via DTE port 30 in step 745. This predefined "AT-command" instructs SVD modem 200 to enter "data-only" mode so that the entire communications channel bandwidth between SVD modems 100 and 200 is allocated to data transmission. In this mode, SVD modem 200 then performs a modem handshaking and training sequence with the far-end modem, i.e., SVD modem 100. At the same time, computer 300 provides a prerecorded message warning user 1 about the upcoming modem handshaking sequence, which user 1 overhears until SVD modem 100 switches to "data-only" mode. After the handshaking sequence, SVD modem 200 transmits the new mode information to SVD modem 100 via the above-described SVD side-channel.

Although the method of FIG. 6 first establishes a voice connection and then a data connection, i.e., a sequential approach, it should be noted that user 1 only establishes one telephone connection to computer 300—no disconnect and callback is required.

Figure 7:
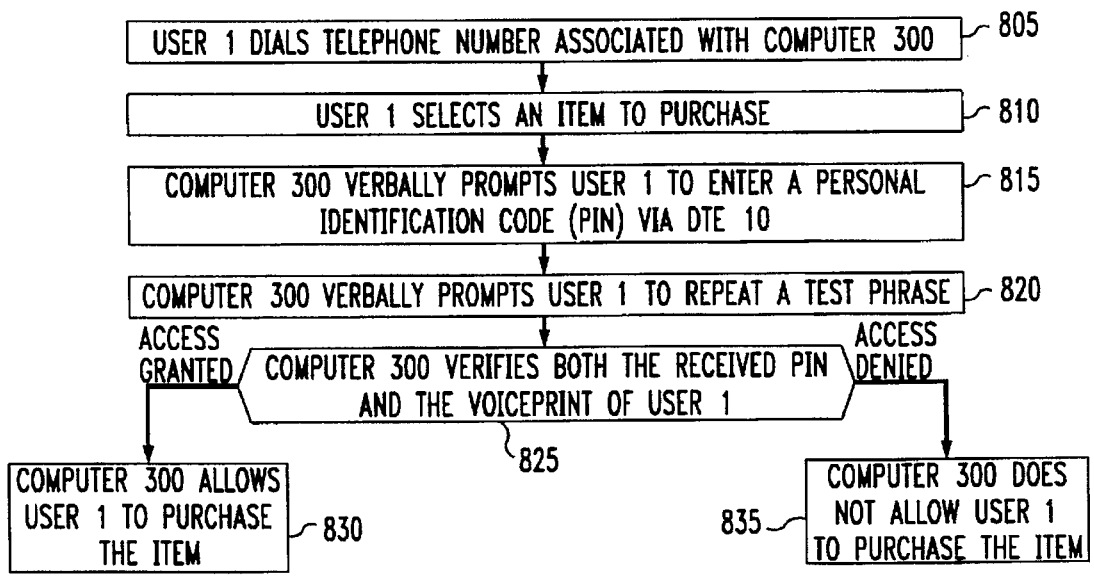
FIG. 7 is an illustrative flow diagram of another method embodying the principles of the invention for providing a security arrangement.

Finally, another illustrative method is shown in FIG. 7. In this method, it is assumed that user 1 accesses computer 300 to "shop." Indeed, computer 300 does not restrict access in any way to calling parties. However, when user 1 desires to purchase something the inventive concept is used to verify the identify of user 1, e.g., for subsequent charging of a credit card. In particular, in step 805 user 1 establishes a data connection to computer 300 to perform electronic shopping. After browsing, via DTE 10, through items of a database (not shown) user 1 decides to purchase an item. Upon selection of an item to purchase in step 810, computer 300 verbally prompts user 1 for entry of their personal identification number (PIN) using speech synthesis technology in step 815. After user 1 enters his, or her, PIN via DTE 10, computer 300 verbally prompts user 1 to speak one of a number of predefined "test phrases" in step 820. One example of such a verbal prompt is "In order to firmly establish your identity, please repeat the following phrase: I would like to purchase an item." Although the prompt herein is described as verbal, the prompt can also be provided to user 1 from computer 300 as written text, which is displayed on DTE 10. This eliminates the need for the voice port of computer 300 to have the ability to transmit an analog voice signal. In step 825, computer 300 verifies the received PIN number from user 1 and correlates the received phrase spoken by user 1 with a stored voiceprint of the same phrase that is associated with the identify of user 1. If the verification is successful, computer 300 allows user 1 to purchase the item in step 830. Conversely, if the verification is not successful, computer 300 does not allow user 1 to purchase the item in step 835.

The mode of SVD modems 100 and 200 in the embodiment of FIG. 7 can either be in "data-only" mode or SVD mode. In the latter mode, then there is concurrent voice and data communications between computer 300 and user 1. In the former mode, then computer 300 must first pass a predefined "AT command" to SVD modem 200 to switch SVD modem 200, and concomitantly SVD modem 100, to SVD mode before providing user 1 with a verbal prompt in step 815.

Figure 8:
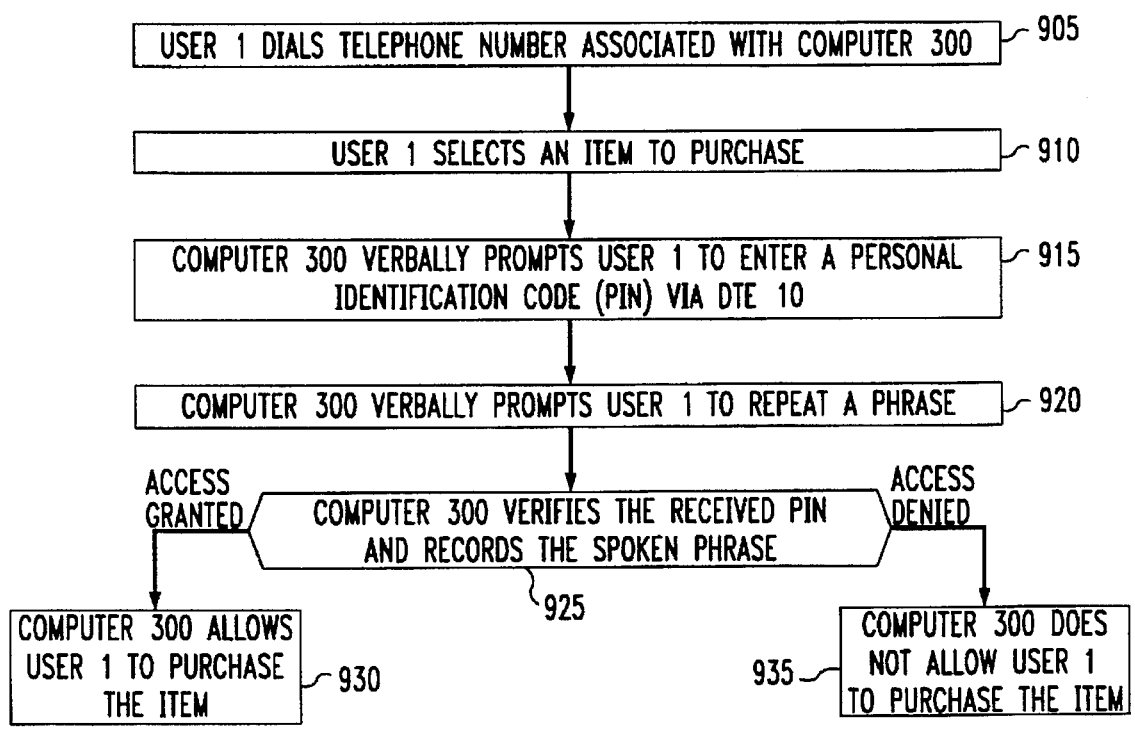
FIG. 8 is an illustrative flow diagram of another method embodying the principles of the invention.

Although the method shown in FIG. 7 verifies the user's identity before allowing the user to, e.g., purchase an item, this method can be additionally simplified as shown in FIG. 8. In step 920, computer 300 prompts user 1 to repeat a phrase like "I, [name of user 1], have agreed to purchase the [description of the selected item]." Computer 300 can provide this prompt either verbally or via text displayed on DTE 10. Computer 300 then verifies the received PIN of user 1 and simply records the phrase spoken by user 1 in step 925. If the received PIN matches, computer 300 allows user 1 to purchase the item and computer 300 archives the voice recording of user 1 in step 930. This voice recording can be later used if there is a billing dispute by user 1, e.g., if user 1 asserts that they did not order the selected item. This method simplifies the hardware requirements for computer 300, which now only has to store the phrase spoken by user 1 as opposed to both creating and verifying a voiceprint as described earlier.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was described in the context of an SVD signal, it should be realized that other forms of simultaneous voice and data transmission could be used, e.g., simple time-division multiplexing of a digitized voice signal and a data signal. In addition, the computer can be coupled to its data communications equipment over two data channels. This requires a conversion of the voice signal to a digital form before receipt by the computer, e.g., an analog-to-digital converter either within modem 200, or between modem 200 and computer 300. Also, if a time-division multiplexer approach is used, a single connection can couple computer 300 to its respective data communications equipment. This single connection conveys the multiplexed voice and data stream to the computer.

In addition, other forms of biometric information can be used like fingerprints, photographs, etc. All that is required is the respective suitable scanning equipment at the location of user 1. Also, a person, e.g., security guard, in conjunction with computer 300 can perform the verification analysis. For example, a picture of user 1 can be transmitted on the analog channel to computer 300. The latter reconstructs the picture for display to the security guard who further compares the image of user 1 to an a priori identification photo also displayed by computer 300. If the security guard identifies user 1 as the person in the identification photo, then the security guard allows user 1 to access computer 300. This same technique could also be used for other forms of biometric information, e.g., the security guard could compare voiceprints on a display of computer 300. It should also be noted that biometric information does not have to be used. For example, the user can simply verbally provide a PIN number via the analog channel. The computer then compares this spoken PIN number to authorized PIN numbers to determine if the user is allowed access, or purchase capability, etc. Finally, although the invention was illustrated in the context of providing a security feature to a computer system, the invention could similarly be applied to controlling access to a physical location, e.g., a building.

We claim:

1. A method for providing security comprising the steps of:

(a) using a multi-media modem for coupling a first channel and a second channel to a computer system;

(b) providing data communications between the computer system and a party via the first channel;

(c) concurrently receiving in the computer system the party's identification information from the second channel; and (d). verifying the party's identity as a function of the party's identification information without disconnecting the first channel.

2. The method of claim 1 wherein the party's identification information is biometric information of the party.

3. A method for use in a computer for providing security comprising the steps of:

(a) coupling the computer to a first port and a second port of a modem;

(b) receiving a first signal from the first port of the modem, where the first signal represents identity information of a user transmitted during a telephone call;

(c) verifying the identify information of the user; and (d) allowing the user to access the computer through the second port of the modem without disconnecting the telephone call if the identify of the user is successfully verified.

4. The method of claim 3 wherein the identity information is biometric information of the user.

5. A method for use in a computer for providing security comprising the steps of:

(a) coupling the computer to a modem;

(b) receiving a multiplexed signal from the modem during a telephone call, where the multiplexed signal includes at least a first signal and a second signal and where at least the first signal represents identity information of a user;

(c) verifying the identify information of the user; and (d) allowing the user to access the computer through the modem without disconnecting the telephone call if the identity of the user is successfully verified.

6. The method of claim 5 wherein the identity information is biometric information of the user.

7. A method for use in a computer, the method comprising the steps of (a) coupling the computer to a first port and a second port of a modem;

(b) establishing a data connection through the second port of the modem with a user, where the data connection allows the user to communicate with the computer; and (c) recording a first signal received from the first port of the modem without disconnecting the data connection.

8. The method of claim 7 wherein the first signal is a voice signal provided by the user.

9. Apparatus comprising:

a modem having at least a first port, a second port, and a network port for coupling to a telephone network to establish a telephone call; and a computer that a) verifies a user's identity by comparing user information to identification information retrieved by the computer, where the user information is provided by the user in the telephone call to the computer over at least the first port, and b) allows the user access to the computer system through the second port of the modem without disconnecting the telephone call when the computer successfully verifies the identify of the user.

10. The apparatus of claim 9 wherein the user information is biometric.

11. The apparatus of claim 9 wherein the network port of the modem provides a tip/ring interface for coupling to the telephone network.

12. Computer apparatus comprising:

(a) a first port for coupling to a port of a modem;

(b) a second port for coupling to another port of the modem; and (c) processing means that:

(i) verifies a user's identity by comparing user information to identification information retrieved by the computer, where the user information is provided by the user in a telephone call coupled through the modem to the computer and received in at least the first port; and (ii) allows the user access to the computer through the second port without disconnecting the telephone call when the computer successfully verifies the identify of the user.

13. Apparatus comprising:

(a) a modem having at least a first port, a second port, and a network port for coupling to a telephone network to establish a telephone call; and (b) a computer that:

(i) verifies a user's identity by comparing user information to identification information retrieved by the computer, where the user information is provided by the user in the telephone call to the computer over at least the first port; and (ii) allows the user access to the computer through the second port of the modem, without disconnecting the telephone call when the computer successfully verifies the identify of the user.

14. Computer apparatus for communicating with a user via a modem, the apparatus comprising:

(a) a first port for coupling to a port of the modem;

(b) a second port for coupling to another port of the modem; and (c) processing means that:

(i) communicates with the user via the second port; and (ii) verifies the user's identity as a function of user information received from at least the first port, without disconnecting the communications over the second port.

15. The apparatus of claim 14 wherein the user information is biometric.

16. Computer apparatus for communicating with a user via a modem, the apparatus comprising:

(a) a first port for coupling to a port of the modem;

(b) a second port for coupling to another port of the modem; and (c) processing means that:

(i) communicates with the user via the second port; and (ii) records a voice signal of the user received via the first port, without disconnecting the communications over the second port.

* * * * *